US012071910B2

(12) United States Patent
Nilsson

(10) Patent No.: US 12,071,910 B2
(45) Date of Patent: Aug. 27, 2024

(54) ALPHA STIRLING ENGINE

(71) Applicant: EnergyIntel Services Ltd, Nicosia (CY)

(72) Inventor: Martin Nilsson, Gothenburg (SE)

(73) Assignee: EnergyIntel Services Ltd.

( * ) Notice: Subject to any disclaimer, the term of this patent is extended or adjusted under 35 U.S.C. 154(b) by 0 days.

(21) Appl. No.: 18/033,826

(22) PCT Filed: Oct. 20, 2021

(86) PCT No.: PCT/SE2021/051034
§ 371 (c)(1),
(2) Date: Apr. 26, 2023

(87) PCT Pub. No.: WO2022/093093
PCT Pub. Date: May 5, 2022

(65) Prior Publication Data

US 2023/0399995 A1 Dec. 14, 2023

(30) Foreign Application Priority Data

Oct. 30, 2020 (SE) .................................... 2051261-2

(51) Int. Cl.
*F02G 1/045* (2006.01)
*F02G 1/04* (2006.01)
*F02G 1/044* (2006.01)

(52) U.S. Cl.
CPC ............... *F02G 1/045* (2013.01); *F02G 1/04* (2013.01); *F02G 1/044* (2013.01); *F02G 2243/30* (2013.01)

(58) Field of Classification Search
CPC . F02G 1/045; F02G 1/04; F02G 1/044; F02G 2243/30
(Continued)

(56) References Cited

U.S. PATENT DOCUMENTS 3,630,041 A 12/1971 Daniels et al.
2005/0223531 A1* 10/2005 Wiseman ................ B23Q 3/18 29/466
(Continued)

FOREIGN PATENT DOCUMENTS

DE 4429602 A1 2/1996
DE 102014114609 B3 11/2015
(Continued)

OTHER PUBLICATIONS

Patent Cooperation Treaty (PCT), International Search Report and Written Opinion for Application PCT/ SE2021/051034 filed Oct. 20, 2021, mailed Nov. 26, 2021, International Searching Authority, SE.

*Primary Examiner* — Hoang M Nguyen
(74) *Attorney, Agent, or Firm* — McCarter & English, LLP; Dave S. Christensen

(57) ABSTRACT

An alpha type Stirling engine is provided and comprises an expansion cylinder and a compression cylinder, a regenerator, a cooler, and a heater. Each one of the expansion cylinder and the compression cylinder has a movable piston connected to a respective linear electric generator/motor, wherein the Stirling engine further comprises a control unit which is operatively connected to the linear electric generators/motors and which is configured to control the linear electric generators/motors individually so as to enable a different stroke length and/or motion profile of the piston in the expansion cylinder compared to the piston in the compression cylinder.

5 Claims, 2 Drawing Sheets

(58) Field of Classification Search
USPC .................................................... 60/517–526
See application file for complete search history.

(56) References Cited

U.S. PATENT DOCUMENTS

| | | | | |
|---|---|---|---|---|
| 2007/0261407 | A1 * | 11/2007 | Bin-Nun .................. | F25B 9/14 60/645 |
| 2016/0040623 | A1 * | 2/2016 | Spiesberger ........... | F02G 1/055 60/517 |

FOREIGN PATENT DOCUMENTS

| | | | |
|---|---|---|---|
| EP | 0043249 | A2 | 1/1982 |
| EP | 1467159 | A1 | 10/2004 |
| GB | 2498378 | A | 7/2013 |
| WO | 2011020988 | A2 | 2/2011 |

* cited by examiner

ALPHA STIRLING ENGINE

CROSS-REFERENCE TO RELATED APPLICATION

This application is a 35 U.S.C. § 371 national stage application of PCT Application No. PCT/SE2021/051034 filed on Oct. 20, 2021 entitled "ALPHA STIRLING ENGINE," which claims priority to Sweden Patent Application No. 2051261-2 filed on Oct. 30, 2020, each of which are incorporated herein in their entirety by reference.

TECHNICAL FIELD

The present invention relates to an alpha type Stirling engine comprising an expansion cylinder, a compression cylinder, a regenerator, a cooler, and a heater.

BACKGROUND

Thermal energy can be converted into electrical energy in several ways. Some systems use Stirling engines as a generator to generate electrical energy from thermal energy. Stirling engines are external, closed-cycle engines which use an external heat source to expand a working gas which drives one or more pistons.

Further, Stirling engines in combination with a thermal energy storage can be used to utilize excess power from e.g. photovoltaic power plants and wind turbines. Instead of curtailing the power when the output of such power plants exceeds electricity demand, the excess power is used to, for instance, charge the thermal energy storage thus making it possible to later draw energy from said storage when demand for electricity exceeds available output from these intermittent renewable sources. It is then possible to use a Stirling engine to convert the thermal energy to electricity.

An alpha arranged Stirling engine has two separate cylinders, which may be inline, parallel or in a V-arrangement. Of the two cylinders, one is hot and the other is cold. The hot cylinder is situated inside or connected to the high temperature heat exchanger and the cold cylinder is situated inside or connected to the low temperature heat exchanger.

The efficiency of Stirling engines depends on many factors such as the type of engine, the working gas used in the engine and the efficiency of the various components within the Stirling engine such as the regenerator.

Generally, the larger the Stirling engines are, the more power they can produce. Some designs results in high working pressures in the cylinders.

The power requirement varies over time. If, for instance, the electric power required at a specific time is lower than usual, the internal pressure could for instance be changed. However, this requires extra equipment which is subject to increased maintenance apart from the extra cost as such for additional hardware. Further, the speed could be varied, but changing the speed generally means deviating from the best possible efficiency of the specific Stirling engine. Optimizing the operation of a Stirling engine is facilitated by an increased number of parameters that could be modulated.

WO 2011/020988 A2 discloses a Stirling engine in which the expansion piston drives a linear electric generator, part of whose output is phase adjusted and fed back to power a linear electric motor driving the compressor.

SUMMARY

It is an object of the present invention to provide an alpha type Stirling engine with improved ability for variable power output. This is achieved with a Stirling engine as described in the appended claims.

The inventor has realized that by decoupling the control of the piston movement in the two cylinders of a Stirling engine it is possible to provide an individual stroke length and/or motion profile for the two pistons. The inventor has also realized by individually selecting such stroke lengths and/or motion profiles in any given situation an effective and adaptive control of the thermal efficiency and/or mechanical work provided by the Stirling engine can be obtained.

According to a first aspect of the present disclosure an alpha type Stirling engine comprises an expansion cylinder, a compression cylinder, a regenerator, a cooler, and a heater. Each one of the expansion cylinder and the compression cylinder has (inside the cylinder) a movable piston connected to a respective linear electric generator/motor. The Stirling engine further comprises a control unit which is operatively connected to the linear electric generators/motors and is configured to control the linear electric generators/motors individually so as to enable a different stroke length and/or motion profile of the piston in the expansion cylinder compared to the piston in the compression cylinder. Thus, by individually changing the pistons to have different stroke lengths and/or different motion profiles the thermal efficiency and/or mechanical work may be changed depending on the current demand. For example, upon low energy demand the stroke of one or both pistons may simply be shortened by controlling the linear electric generators/motors. Furthermore, changing the motion profiles individually may allow for fine tuning of the operation of the engine, making possible the optimization of efficiency over the complete range of power outputs. It may also be possible during times to only use motion profiles as a means of controlling the engine, without altering the stroke length, or any other operating parameter, e.g. internal working pressure or frequency.

It should be understood that the control unit is suitably configured to control the phase difference between the two pistons (similarly to the function of any Stirling engine). Thus, the fact that the control unit can control the linear electric generators/motors individually to enable different stroke length and/or motion profile of the pistons, does not rule out normal control of the phase difference between the two pistons.

As will be readily understood, the present invention provides more flexibility in controlling the operation of the Stirling engine than the prior art. For instance, in the above mentioned prior art document WO 2011/020988 A2 the operation of the motor is dependent on the control of the generator, and the two are thus not individually controllable, therefore providing less flexibility than what is enabled by the present invention.

In such a linear electric generator/motor, a magnet moves in relation to an electromagnetic coil. This changes the magnetic flux passing through the coil, and thus induces the flow of an electric current, which can be used to do work. A linear electric generator/motor is most commonly used to convert back-and-forth motion directly into electrical energy. This short-cut eliminates the need for a crank or linkage that would otherwise be required to convert a reciprocating motion to a rotary motion in order to be compatible with a rotary generator.

From the above it should thus be understood that in at least some exemplary embodiments, the control unit may control the piston of the expansion cylinder to have a different stroke length compared to the piston of the compression cylinder. Thus, translated to a sinus curve, the amplitude of the movement of the pistons may be different. In at least some exemplary embodiments, the control unit may control the piston of the expansion cylinder to have a different motion profile compared to the piston of the compression cylinder. The motion profile translated to a sinus curve is the profile of the curve. As can be readily understood, the motion profile is not only determined by the stroke length (i.e. the amplitude of the curve), but also by the rate at which the piston is accelerated from retracted towards extended position and vice versa (i.e. the inclination of the curve). From the above, it should also be understood that the translated motion profile may deviate from the shape of a sinus curve, having for example a flatter profile at the peak and/or trough of the curve.

Although the control unit is configured to control the linear electric generators/motors individually so as to enable different stroke lengths and/or motion profiles of the two pistons, the frequency of the reciprocating movements of the piston may suitably be controlled to be the same. In other words, the control unit may control the pistons (via the linear electric generators/motors) such that the time it take for each piston to make a full stroke back and forth is the same. However, as is normal in alpha type Stirling engines, the strokes of the two pistons are controlled to be phase shifted. In at least some exemplary embodiments, the control unit may for a given situation optimize the thermal efficiency and/or work by testing a plurality of different strokes and/or motion profiles of the two pistons, and to receive feedback on the thermal efficiency and/or work obtained for each tested combination, and select the most suitable combination for the given situation. In other exemplary embodiments, the control unit may be pre-programmed with a number of different combination of strokes and/or motion profiles for the two pistons, such as in a look-up table, wherein based on user input or input from sensors/detectors or the like, the control unit will control the Stirling engine with one of the pre-programmed combinations.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where it includes a programmable device such as the microprocessor, microcontroller or programmable digital signal processor mentioned above, the processor may further include computer executable code that controls operation of the programmable device.

According to another aspect of the present disclosure the control unit is configured to control the linear electric generator/motors such that the stroke lengths and/or motion profiles are variable for both the expansion cylinder piston and the compression cylinder piston. For some setups it may be advantageous to vary the stroke length and/or motion profiles for both the expansion cylinder piston and the compression cylinder piston.

According to an alternative aspect of the present disclosure the cylinders are arranged in line with the cylinder heads facing each other. This setting could be advantageous for some solutions.

The expansion and compression cylinders are according to yet another aspect of the present disclosure configured in a V-arrangement.

According to an aspect of the present disclosure the expansion cylinder and the compression cylinder are arranged in parallel with each other and with the cylinder heads facing in the same direction. This is advantageous as it may in some cases facilitate integration with surrounding equipment. In some cases, such a parallel arrangement may simplify the overall structure, allowing some components to be omitted compared to other non-parallel arrangements.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION OF EXAMPLE EMBODIMENTS OF THE INVENTION

Figure 1:
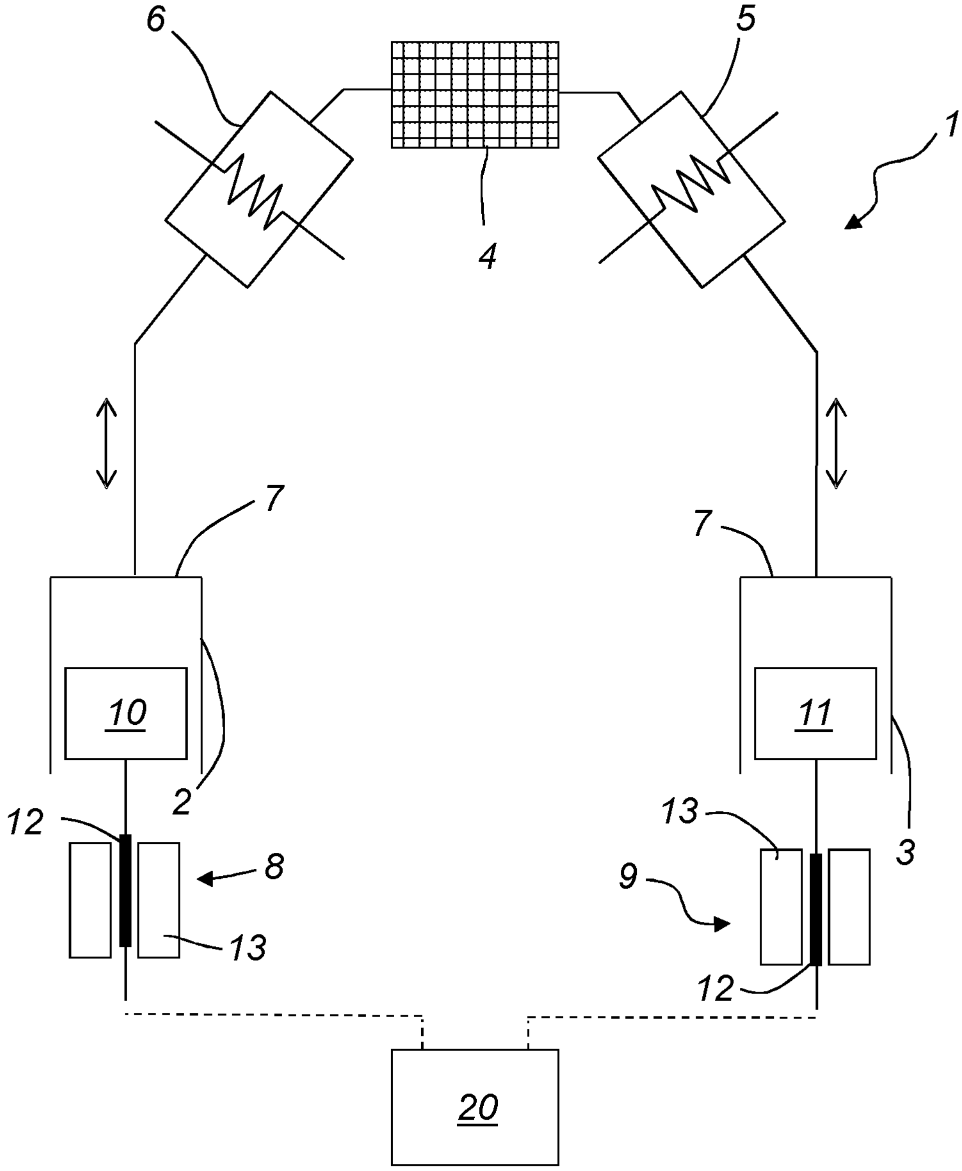
FIG. 1 is a schematic drawing of a Stirling engine according to the present disclosure and FIG. 2 is a schematic drawing of an alternative setup according to the present disclosure.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

With reference to FIG. 1, an alpha type Stirling engine 1 comprises an expansion cylinder 2 and a compression cylinder 3, a regenerator 4, a cooler 5, and a heater 6. From a fluid path perspective, the expansion cylinder 2 and the heater 6 are provided on one side of the regenerator 4. The compression cylinder 3 and the cooler 5 are provided on the other side of the regenerator 4. Both the expansion cylinder 2 and the compression cylinder 3 has a piston 10, 11 which is movable within the respective cylinder 2, 3 and which is connected to a respective linear electric generator/motor 8, 9 controlled such that the stroke length and/or the motion profile is variable.

Further, in the linear electric generator/motor 8, 9, a magnet 12 moves in relation to an electromagnetic coil 13. This changes the magnetic flux passing through the coil, and thus induces the flow of an electric current, which can be used to do work. The linear electric generator/motor 8, 9, or sometimes called a linear alternator, thus converts the reciprocating motion to electric power. For some stages in the Stirling engine 1, the linear electric generator/motor instead drives the reciprocating motion with the use of electric power.

A control unit 20 is provided and operatively connected to the linear electric generators/motors 8, 9. The control unit 20 is configured to control the linear electric generators/motors 8, 9 individually so as to enable a different stroke length and/or motion profile of the piston 10 in the expansion cylinder compared to the piston 11 in the compression cylinder 3. Hereby a flexible control is achievable as explained previously in this disclosure.

Figure 2:
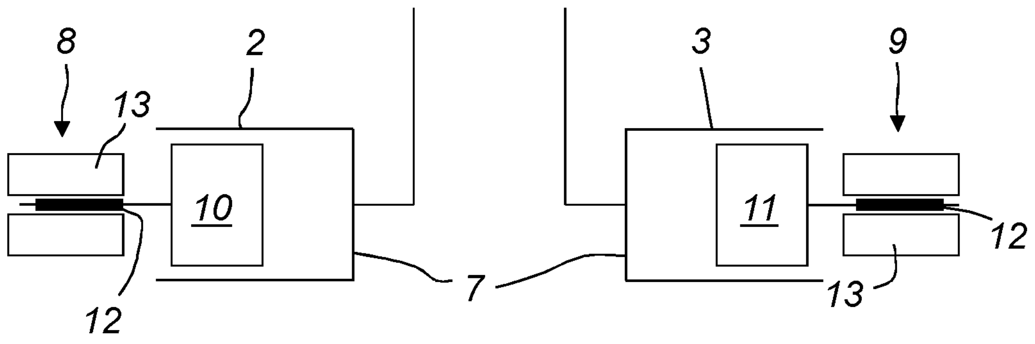

Turning to FIG. 2, the cylinders 2, 3 are arranged in line with the cylinder heads 7 facing each other (this is contrast to FIG. 1 in which the cylinders 2, 3 are arranged in parallel with each other and with the cylinder heads 7 facing in the same direction).

Preferably, the piston movement of the expansion cylinder 2 and the compression cylinder 3 are arranged to be controlled individually. One advantage is that the cylinders or rather the pistons to some extent will balance each other throughout the strokes.

Although not illustrated in FIG. 2 it should be understood that the linear electric generators/motors 8, 9 may suitably be controlled by a control unit in a corresponding manner as explained in connection with the control unit 20 in FIG. 1.

It is to be understood that the present invention is not limited to the embodiments described above and illustrated in the drawings; rather, the skilled person will recognize that many changes and modifications may be made within the scope of the appended claims. For example, a spring could be arranged at the end of the reciprocating members of the piston in order to provide balancing motion or aid in piston movement at stroke end points.

The invention claimed is:

1. An alpha type Stirling engine comprising:

an expansion cylinder; and a compression cylinder;

a regenerator, a cooler, and a heater;

wherein each one of the expansion cylinder and the compression cylinder has a movable piston connected to a respective linear electric generator/motor; and, a control unit operatively connected to the linear electric generators/motors and configured to control the linear electric generators/motors individually so as to enable a different stroke length and/or motion profile of the piston in the expansion cylinder compared to the piston in the compression cylinder.

2. The Stirling engine according to claim 1, wherein the control unit is configured to control the linear electric generator/motors such that the stroke lengths and/or motion profiles are variable for both the expansion cylinder piston and the compression cylinder piston.

3. The Stirling engine according to claim 1, wherein the cylinders are arranged in line with the cylinder heads facing each other.

4. The Stirling engine according to claim 1, wherein the expansion and compression cylinders are configured in a V-arrangement.

5. The Stirling engine according to claim 1, wherein the expansion cylinder and the compression cylinder are arranged in parallel with each other and with the cylinder heads facing in the same direction.

* * * * *